United States Patent [19]

House

[11] Patent Number: 5,711,778
[45] Date of Patent: Jan. 27, 1998

[54] METHOD AND APPARATUS FOR ANNEALING GLASS SHEETS

[75] Inventor: Keith L. House, Corning, N.Y.

[73] Assignee: Corning Incorporated, Corning, N.Y.

[21] Appl. No.: 670,963

[22] Filed: Jun. 26, 1996

Related U.S. Application Data

[60] Provisional application No. 60/016,780, May 7, 1996.

[51] Int. Cl.⁶ .................................................. C03B 25/00
[52] U.S. Cl. ............................ 65/117; 65/118; 65/119; 65/348; 65/349
[58] Field of Search ............................ 65/117, 118, 119, 65/348, 349, 350, 351, 114, 115, 116, 95; 269/108, 109, 111, 118, 116, 117, 130, 132, 287, 902, 909

[56] References Cited

U.S. PATENT DOCUMENTS

| | | | |
|---|---|---|---|
| 1,214,905 | 2/1917 | Engstrom | 269/287 |
| 1,961,036 | 5/1934 | Boyle | 269/110 |
| 3,002,321 | 10/1961 | Dunipace et al. | 65/119 |
| 3,147,104 | 9/1964 | Dunipace et al. | 65/349 |
| 3,220,817 | 11/1965 | Malobicky et al. | 65/114 |
| 3,310,273 | 3/1967 | Seymour | 65/114 |
| 3,466,706 | 9/1969 | Asano | 269/909 X |
| 3,525,515 | 8/1970 | Melfi | 269/287 |

Primary Examiner—Donald E. Czaja
Assistant Examiner—Sean Vincent
Attorney, Agent, or Firm—Robert L. Carlson

[57] ABSTRACT

A method and apparatus for annealing glass sheets, in which glass sheets are retained within a frame having edge retaining members. The edge retaining members retain the edges of the glass sheet during the annealing operation, thereby hindering warpage and surface damage of the glass sheet during the annealing process.

18 Claims, 4 Drawing Sheets

METHOD AND APPARATUS FOR ANNEALING GLASS SHEETS

RELATED APPLICATIONS

This application claims benefit of the priority date of U.S. Provisional Application No. 60/016,780, filed May 7, 1996.

FIELD OF THE INVENTION

The present invention relates to a method and apparatus for annealing glass sheets.

BACKGROUND OF THE INVENTION

Glass sheets are annealed by heating the glass to a temperature at which the glass structure is able to relax, after which the glass is held for a period of time necessary to achieve the desired amount of relaxation or annealing. One method used in the past to anneal glass sheets involves feeding such glass sheets individually in a horizontal position through a relatively long annealing lehr.

One type of glass sheet which usually requires annealing is that used in flat panel displays, such as, for example, liquid crystal displays (LCDs). The fabrication for such flat panel displays, particularly those which utilize polysilicon technology, often involves successive processing steps at elevated temperature (200°–600° C.). Because of the high registration requirement for films deposited during these processing steps, the glass substrates often require a dimensional stability (low shrinkage) in the 5–20 parts per million (ppm) range throughout this processing. Five to twenty parts per million shrinkage means, for example, 2.5–10 microns shrinkage over a substrate length of 500 mm. When greater than 5–20 ppm shrinkage occurs, registration errors may accrue between film components applied subsequently in the manufacturing process.

Consequently, glass sheets which are to be used as flat panel display substrates must be annealed to a greater extent than is typically necessary in other areas of the glass industry, e.g., automotive or architectural float glass manufacturing. In addition, these glass sheets must retain their flatness and scratch free surface quality during and after the annealing operation. Unfortunately, the typical prior art methods for annealing such sheets resulted in an unacceptable amount of warping and surface damage to the glass sheets, making the sheets unacceptable for use as flat panel display substrates.

SUMMARY OF THE INVENTION

One aspect of the present invention relates to a frame for supporting glass sheets during an annealing operation. Preferably the frame is designed to support the sheets in a vertical position during the annealing process. In one embodiment of the invention, the frame consists of edge retaining members, each of the edge retaining members comprising slots therein for retaining at least a substantial portion of the edges of each glass sheet. For example, the frame may consist of two or more L-shaped edge retaining members each L-shaped member consisting of two edge retaining members which are hinged together at their ends. In a preferred embodiment, two of such L-shaped edge retaining members are employed in the frame, each one being centered on opposing corners of the glass sheets. A clamping device is preferably employed to apply a force on each of the two side edge retaining members in the direction of the other side retaining members, thereby drawing the side edge retaining members toward each other. Preferably, in such embodiments, the two opposing L-shaped edge retaining members are not in contact with one another.

Another aspect of the present invention relates to a method of annealing glass sheets wherein a plurality of glass sheets are retained vertically within a frame. In preferred embodiments of the invention, the frame described above, which consists of edge retaining members is utilized.

The method and apparatus of the present invention results in a number of advantages over the prior art methods of annealing glass. For example, the frame employed in the present invention enables the glass sheets to expand or contract during the annealing process, while the edges of the glass sheet are still retained in their original position. This retaining of the edges of the glass sheet in their original position helps prevent warping of the glass sheet during the annealing process. In addition, the frame of the present invention facilitates supporting of the glass sheets in a vertical position during the annealing operation, which also helps prevent warping.

DETAILED DESCRIPTION OF THE INVENTION

Figure 1:
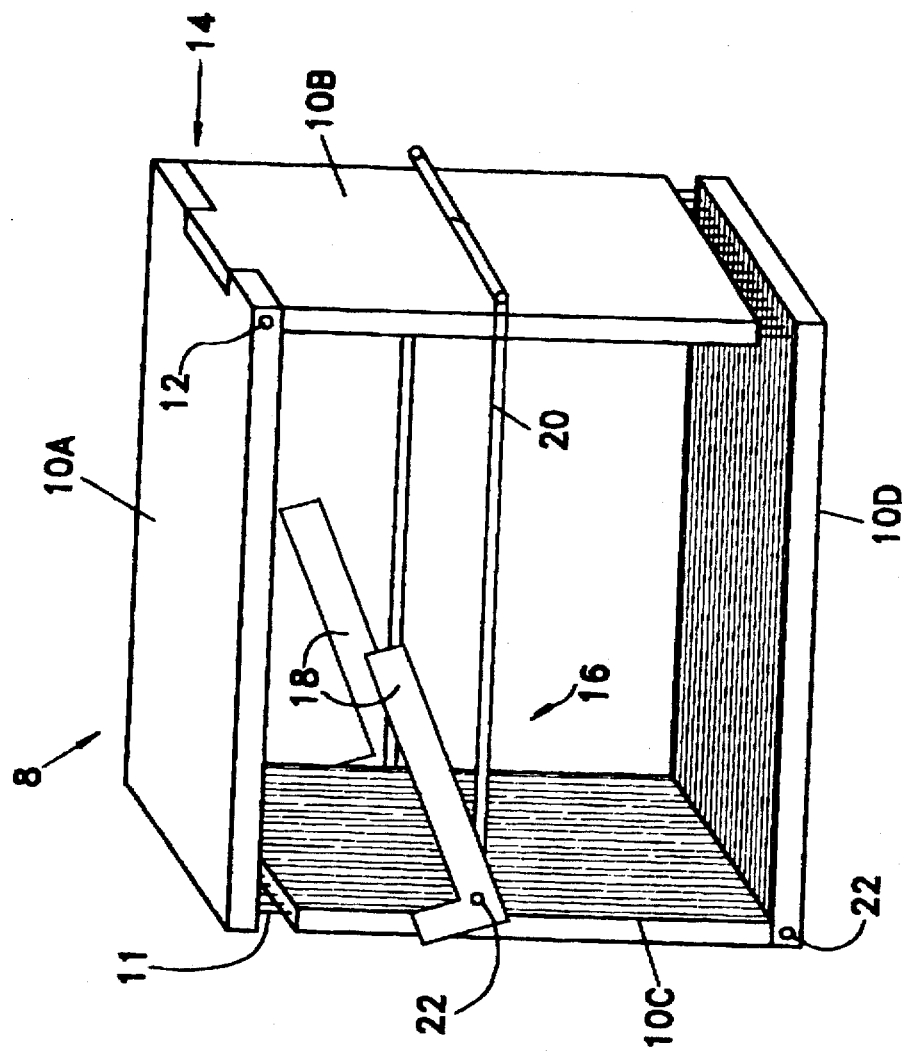
FIG. 1 illustrates a frame in accordance with the present invention for annealing glass sheets.

FIG. 1 illustrates a frame 8 in accordance with the invention for retaining glass sheets in a vertical position during a glass annealing process. As illustrated in FIG. 1, the frame consists of a plurality of edge retaining members 10A–10D. The edge retaining members are so-called because they retain, at least substantially, the edges of the glass sheets 11 during the annealing process. Consequently, the tendency for the sheets to deform along their edges due to the structural relaxation which occurs during the annealing process is minimized.

Figure 2:
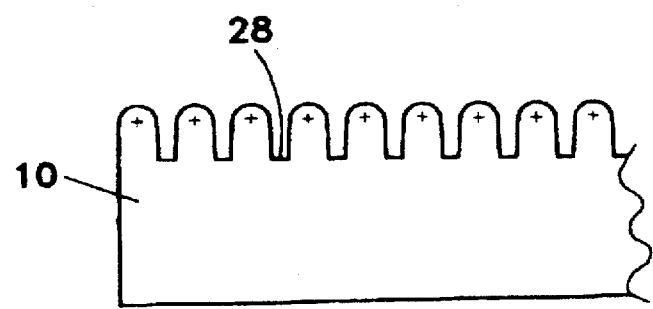
FIG. 2 illustrates a side view of an edge retaining member in accordance with the invention.

For example, in the embodiment illustrated in FIG. 2, each edge retaining member 10A through 10D has a plurality of grooves 28 therein which retain the edges of the glass sheets. Preferably, these grooves or slots 28 are angled outwardly to facilitate inserting and removal of the glass sheets. Preferably, the minimum width of the slots 28 is wider than the thickness of the glass sheets to be inserted therein. In the embodiment illustrated in FIG. 1, each edge retaining member 10A–10D is pivotally connected to another edge retaining member via a steel pin 12 to form a pair of L-shaped edge retaining members 14. A clamping device 16 is employed to provide a force on the two side edge retaining members 10B–10C.

The clamping device 16 consists of two L-shaped clamp arms 18 and a banding structure 20 which, in combination with the clamp arms 18, encapsulate the sides of the frame 8. The banding structure 20 attaches to one end of the L-shaped clamp arm 18 and the back of edge retaining member 10C. The remainder of the banding structure 20 extends around the remainder of the sides of the frame, i.e., edge retaining member 10B. Gravity forces the weight of the larger distal end of clamping arm 18 in a downward direction, thereby providing a force upon banding structure 20 via pivot pin 22 in a sideways direction, thereby drawing side edge retaining member 10C toward side edge retaining member 10B. If desired, a metal or other type of strap (not shown) can be hung over the top edge retaining member 10A and attached to the banding structure 20 along the side edge retaining members 10B and 10C to help retain the banding structure 20 in place.

Because of the slots 28 which retain the edges of the glass sheets, the edge retaining members 10A through 10D are able to move, i.e., the frame 8 is able to expand with expansion and contraction of the glass sheets during the annealing process. However, the edges of the glass sheets are still retained within the plane they originally were in prior to the annealing process. This greatly facilitates retaining the flatness of the glass sheets during the annealing process and prevents warping of the glass.

Figure 3:
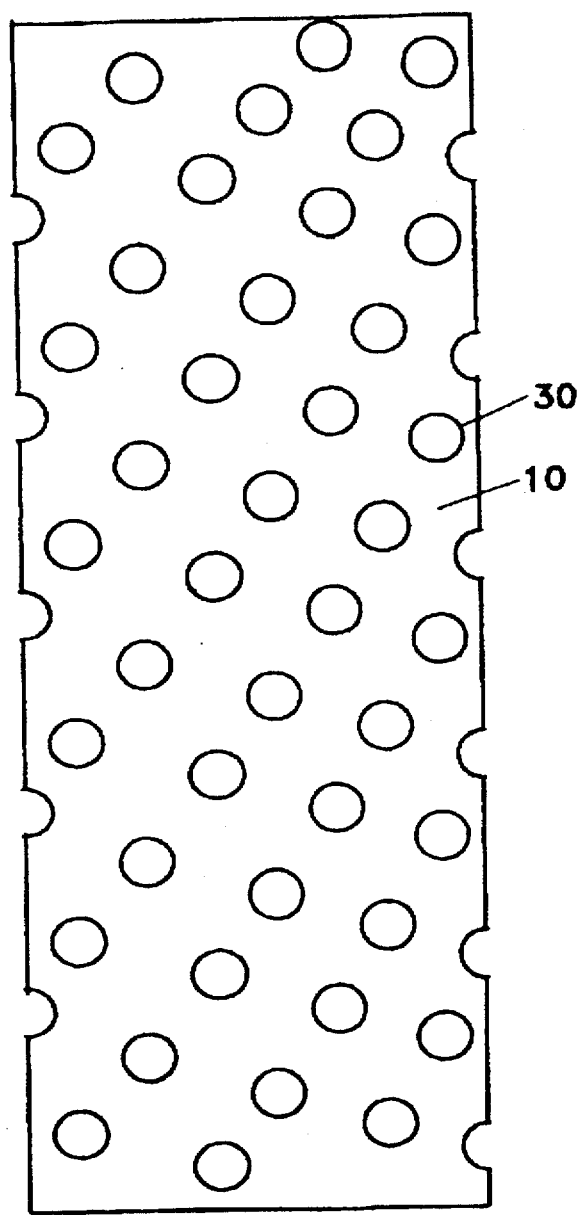
FIG. 3 illustrates a top view of an edge retaining member in accordance with the invention.

As illustrated in FIG. 3, in preferred embodiments, a plurality of holes 30 are provided through each of the edge retaining members 10A through 10D, to facilitate uniform heating of the glass by convection heat transfer through each of the holes 30.

Figure 4:
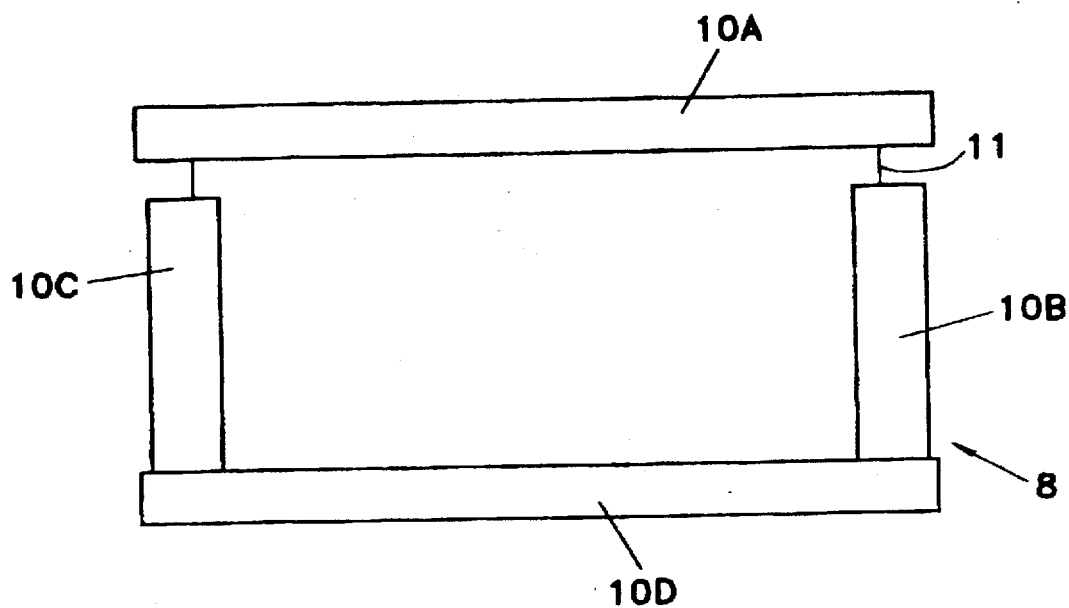
FIG. 4 illustrates an alternative frame in accordance with the present invention.
Figure 5:
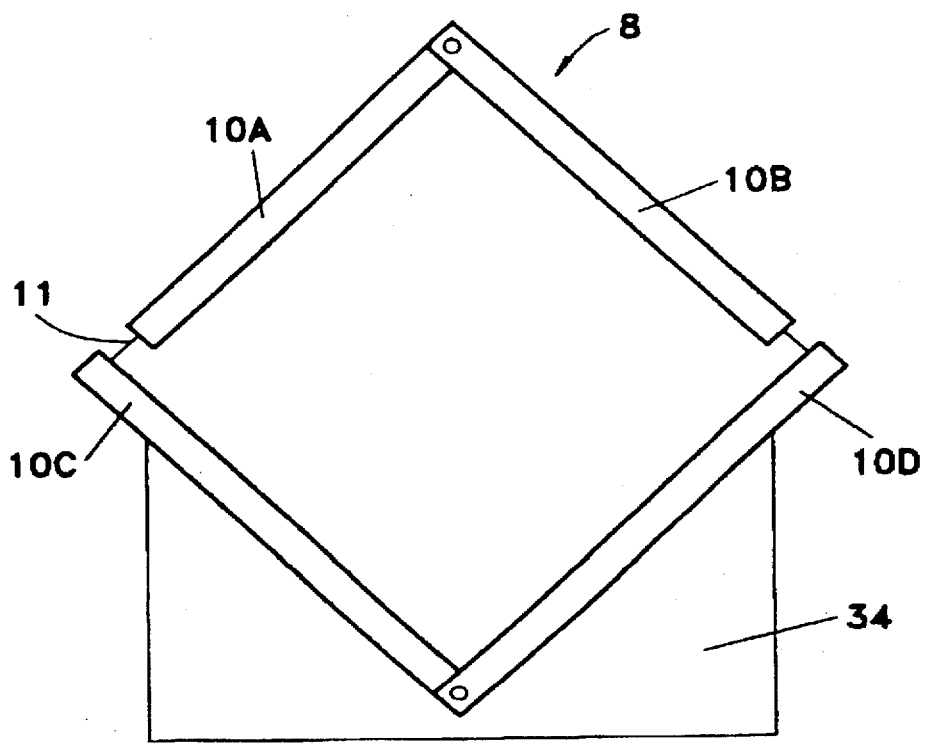
FIG. 5 illustrates another alternative frame assembly in accordance with the present invention.

Some alternative embodiments of the invention are illustrated in FIGS. 4 and 5. FIG. 4 illustrates a side view of a frame 8 having four edge retaining members 10A–10D. Edge retaining members 10B and 10C rest on top of edge retain member 10D. Edge retaining member 10A rests on top of the glass sheets 11. In this manner, all four edges of the glass sheets 11 have the edges retained within edge retaining members during the annealing operation. However, the side edge retaining members 10B and 10C are still preferably clamped together with some sort of banding structure and thereby urge the side edge retaining members 10B and 10C toward the glass sheets, as was the case in the embodiment illustrated in FIG. 1.

In FIG. 5, L-shaped edge retaining members 14 are again utilized. However, rather than using a banding structure 20 to apply a force to some of the edge retaining members, the frame is positioned at an angle, e.g. about a 45 degree angle, by supporting the frame within support structure 34, and gravity is employed to apply a force on all four edges of the glass sheet 11. While this embodiment does work satisfactorily, it has poorer space utilization than the embodiment illustrated in FIG. 1.

Although the invention has been described in detail for the purpose of illustration, it is understood that such detail is solely for that purpose and variations can be made therein by those skilled in the art without departing from the spirit and scope of the invention which is defined by the following claims.

What is claimed is:

1. A method of annealing glass sheets comprising:
    assembling a plurality of glass sheets vertically in a frame, said frame separating said glass sheets while simultaneously retaining portions of all four edges of the glass sheets; and
    annealing the glass by exposing the glass sheets, while still retained within the frame, to a temperature suitable for relieving stress within the glass sheets.

2. The method of claim 1, wherein said frame in said assembling step comprises edge retaining members, said edge retaining members comprising slots therein for retaining the edges of said glass sheet.

3. The method of claim 2, wherein said frame in said assembling step comprises two side edge retaining members, a top edge retaining member, and a bottom edge retaining member, each edge retaining member for retaining a respective edge of said glass sheets.

4. The method of claim 3, wherein said frame in said assembling step further comprises a clamping device for applying a force on each of the two edge retaining members in the direction of the other edge retaining member, whereby said edge retaining members are drawn toward one another.

5. The method of claim 2, wherein said frame in said assembling step comprises L-shaped edge retaining members, each L-shaped edge retaining member comprising a pair of edge retaining components which are pivotally connected.

6. The method of claim 5, wherein said annealing step comprises applying a force in the direction of the glass sheet on each of the edge retaining components.

7. The method of claim 6, wherein said L-shaped edge retaining members do not contact one another.

8. The method of claim 7, wherein said frame further comprises a clamping device for applying said force on each of the two edge retaining members in the direction of the other edge retaining member.

9. A frame for supporting glass sheets during an annealing operation comprising at least two edge retaining members, said edge retaining members comprising slots therein for retaining the edges of said glass sheet, said frame further comprising a clamping device for applying a force on one of said at least two edge retaining members in the direction of another of said at least two edge retaining members, whereby said edge retaining members are drawn toward one another.

10. The frame of claim 9, wherein said frame comprises at least two side edge retaining members, a top edge retaining member, and a bottom edge retaining member, each edge retaining member for retaining a respective edge of said glass sheets.

11. The frame of claim 9, wherein said frame comprises edge retaining members which are pivotally connected to form L-shaped edge retaining members.

12. The frame of claim 9, wherein said frame comprises two L-shaped edge retaining members.

13. The method frame of claim 12, wherein said two L-shaped edge retaining members do not contact one another.

14. The method of claim 1, wherein said frame comprises at least one L-shaped edge retaining member.

15. The method of claim 14, wherein said at least one L-shaped edge retaining member comprises a pair of edge retaining components which are pivotally connected to one another.

16. A method of annealing glass sheets comprising:
    assembling a plurality of glass sheets vertically in a frame, said frame separating said glass sheets while simultaneously retaining portions of all four edges of the glass sheets, said frame comprising edge retaining members having slots therein, said slots for retaining said edges of said sheets.

17. The method of claim 16, wherein said frame comprises at least four of said edge retaining members, each edge of said sheets being supported by one of said slots.

18. The method of claim 1, wherein said retaining comprises retaining substantial portions of all four edges of said sheets.

* * * * *